April 26, 1966 J. SHUSTER 3,247,740
TRANSMISSION CONTROL SYSTEMS
Filed Jan. 31, 1964

INVENTOR
JACOB SHUSTER 3,247,740
TRANSMISSION CONTROL SYSTEMS
Jacob Shuster, Montgomery County, Md.
(1904 Reedie Drive, Silver Spring, Md.)
Filed Jan. 31, 1964, Ser. No. 341,617
3 Claims. (Cl. 74—752)

This invention relates to improved control systems for transmissions as disclosed in my prior copending application, Serial No. 99,177, filed March 29, 1961, now Patent No. 3,120,763. The disclosure of the aforesaid patent is therefore incorporated herein, this application being a continuation-in-part of the prior copending application.

An important object of the present invention is to provide a control system adapted to accept externally generated signals through which traffic authorities may impose a regulatory influence conducive to safer operation of the vehicle without any necessary radical modification of the existing transmission control system from a structural standpoint or in a psychological sense from the driver's standpoint.

An additional object of this invention is to provide an electrically operated control system capable of coordinating drive ratio, regulation with vehicle speed and path deviation with a minimum number of components.

The foregoing and other objects and advantages of the invention will be apparent from ahe following description and from the accompanying drawings in which.

Figure 1:
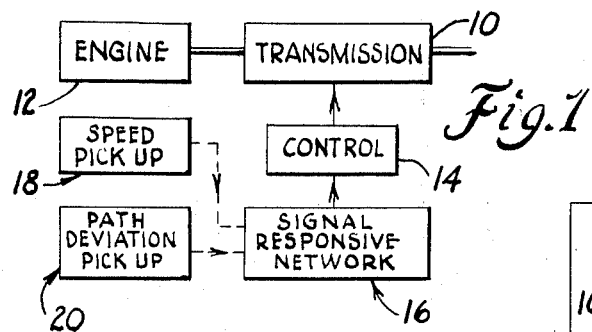
FIGURE 1 is a block diagram of a system incorporating the principles of the present invention.

Referring to the drawings in detail, and initially to FIGURE 1, reference numeral 10 denotes generally a transmission, which may be of the type disclosed in my prior copending application aforementioned. The transmission is connected to the vehicle engine 12 and is associated with a control system 14 such as any one of the systems disclosed in the aforesaid copending application. Also associated with the control system is a signal responsive network 16 coordinating signals received from a signal developing assembly comprising a speed pick-up 18 and a path deviation pick-up 20. The network 16 is thereby rendered conscious of at least two conditions through which it is operative upon the control 14 to reguate the drive ratio of the transmission 10.

Figure 2:
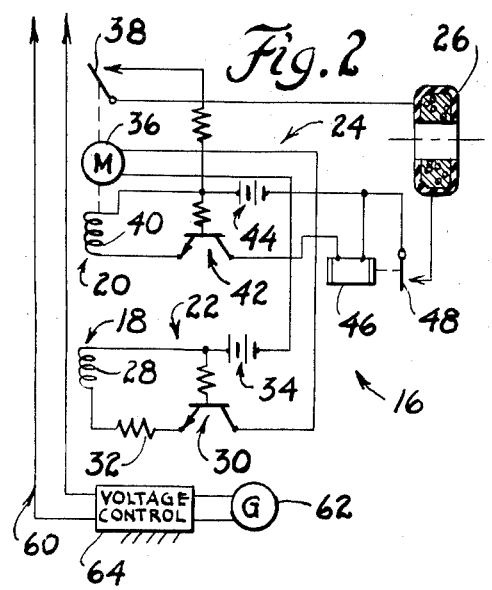
FIGURE 2 is a circuit diagram of one form of signal responsive network utilized in the system.

Considering now FIGURE 2 showing one form of signal responsive network corresponding to that disclosed in the aforementioned prior copending application, it will be noted that it consists of a fixed signal responsive section 22 and a variable signal responsive section 24 operatively connected to the solenoid control device 26 in the control system. The fixed speed pick-up coil 28 associated with the signal developing assembly forms the signal input to the semiconductor device 30 in the section 22 of the network. The semiconductor device 30 is a transistor having an input base-emitter circuit with the resistor 32 and coil 28 in series and an output base-collector circuit in which the voltage source 34 is located as well as the load in the form of servo motor 36. A speed responsive signal induced in coil 28 of sufficient intensity or magnitude will change the conductance of coil 28 and render the transistor conductive so as to establish an energizing current in the output circuit for the motor 36 causing it to close switch 38 and displace pick-up coil 40 of the signal developing assembly to a minimum signal pick-up position. As disclosed in Patent No. 3,120,763 aforementioned, the switch 38 includes a control arm connected to the motor 36 and biased by a spring to an opened switch position when the motor is deenergized.

Figure 3:
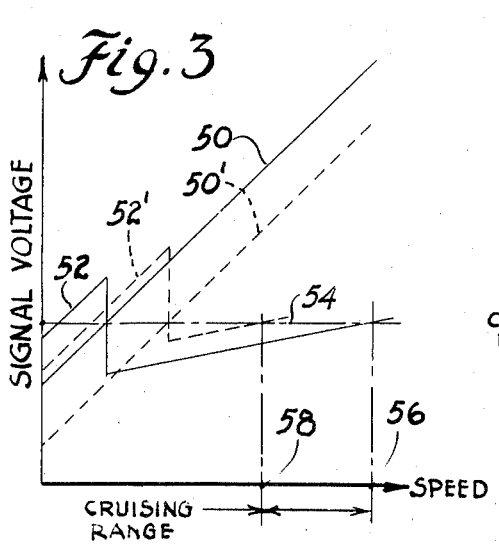
FIGURE 3 is a graphical representation of the voltages developed in the network.

The coil 40 which forms the path deviation pick-up 20 is connected to the input circuit of a semiconductor device 42 in the network section 24 operative to render device 42 conductive when the intensity of the signal induced therein reaches a predetermined level. With the coil 40 in its minimum signal pick up position and the signal voltage induced therein below the predetermined level, the transistor 42 will be biased beyond cut-off because a volt drop across the coil 40 will supply a positive potential from the voltage source 44 to the emitter. Upon development of the requisite induced voltage in coil 40, a negative potential is established on the emitter relative to the base in order to apply a forward bias rendering the transistor 42 conductive. When this occurs, the output circuit including the voltage source 44 conducts an energizing current for relay coil 46 to close relay switch 48. The relay switch 48 is connected to the solenoid 26 so that when it is closed, it will complete a parallel energizing circuit only if the switch 38 has already been closed because of a signal received in section 22 of an intensity that is below the predetermined level at which section 24 is rendered operative. Referring to FIGURE 3, it will therefore be observed that the speed responsive signal voltage 50 applied to section 22 increases with speed together with the voltage 52 applied to section 24 until a trigger voltage 54 is attained causing section 22 to supply energizing current to motor 36 resulting in a sharp drop in the signal voltage in the section 24. The signal voltage in section 24 thereafter increases at a lower rate with increase in vehicle speed until a predetermined signal or trigger voltage is attained causing energization of the solenoid as aforementioned, at the prescribed vehicle speed limit 56. If the vehicle deviates from its prescribed path, lower signal voltages 50' and 52' are induced as indicated by dotted lines in FIGURE 3 so that the solenoid 26 becomes energized at a lower vehicle speed 58. The relative drops in signal voltages in sections 22 and 24 depends of course on the circuit parameters arranged so that the lower speed limit 58 will vary in accordance with the desired function of path deviation. Thus, the network responds to deviation of the vehicle from its prescribed path to cause downshift of the transmission if the vehicle speed exceeds a lower limit indicated by numeral 58. This is desirable in order to provide additional accelerating power for passing purposes as well as a restraint if no acceleration is being effected. The speeds 56 and 58 will therefore prescribe the limits of a cruising range for the vehicle traveling in the prescribed path.

The limits 56 and 58 of the prescribed range may be varied by the traffic authorities. Toward this end, the road embedded conductor components 60 are connected to the source of energy 62 through a voltage control device 64 in order to vary the intensity of the magnetic field energy. It will of course be appreciated that other methods for generating radiant energy may be utilized to be picked up by the signal developing assembly mounted on the vehicle.

Figure 4:
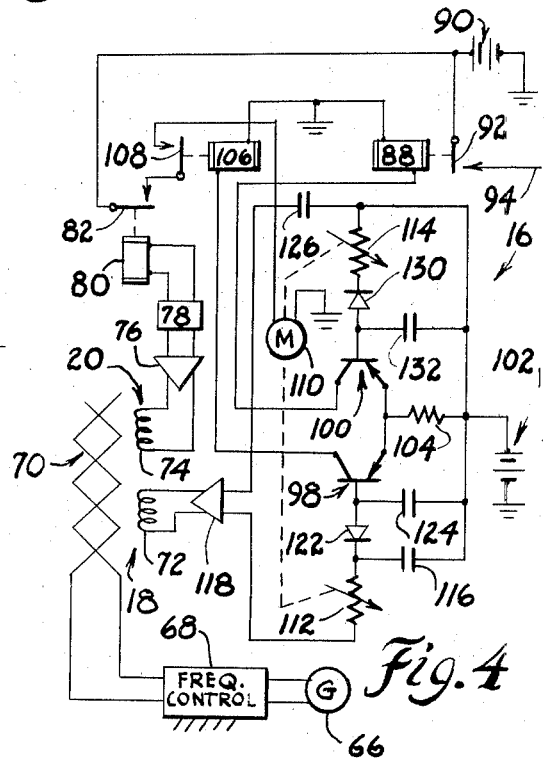
FIGURE 4 is a circuit diagram of another form of signal responsive network.

In FIGURE 4, electrical energy is generated by a fluctuating voltage supplied by generator 66 through a frequency control 68 to the road embedded conductors 70 which are disposed in the criss-crossing pattern shown so as to induce a speed responsive signal voltage in the pickup coils 72 and 74 respectively associated with the speed pick-up 18 and path deviation pick-up 20. The frequency of the signal voltage induced in the coils 72 and 74 will therefore depend on the setting of the frequency control 68 and the speed of the vehicle. The intensity or amplitude of the signal voltage will depend on the deviation of the vehicle and the pick-up coils from the prescribed path.

The path deviation pick-up 20 is associated with a fixed signal responsive section in the form of the speed responsive network illustrated in FIGURE 4, with coil 74 connected by a current amplifier 76 and a rectifier circuit 78 to a signal responsive relay coil 80 energized when the vehicle is traveling in the prescribed path because of the amplitude of the signal induced in coil 74. Energization of relay coil 80 is thereby operative to close relay switch 82 so as to condition a variable signal responsive section for actuation of the control 14 by energization of the relay coil 88 associated therewith. A grounded source of voltage 90 is therefore connected to the relay switches 82 and 92 for energization of relay coil 88 closing relay switch 92 in order to connect the source 90 to a grounded solenoid in the control 14 through conductor 94.

Figure 5:
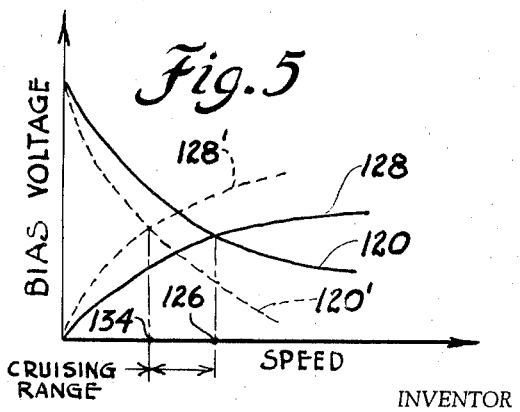
FIGURE 5 is a graphical representation of the voltages developed in the network of FIGURE 4.

The variable signal responsive section includes a differential amplifier comprising transistors 98 and 100, the emitters of which are connected to the positive terminal of the grounded voltage source 102 through the bias resistor 104. The collector of transistor 98 is connected to the relay coil 106 grounded in common with relay coil 88 connected to the collector of transistor 100. Thus, when transistor 98 is conductive, energizing current is supplied from source 102 to the relay coil 106 closing the relay switch 108 associated therewith. The relay switch 108 is connected in series with relay switch 82 so that when both are closed the source 90 is connected to the servo motor 110 for energization thereof. When so energized because of the signal intensity of the signal induced in the fixed signal responsive section, motor 110 displaces the variable resistors 112 and 114 to one of two settings. The resistor 112 and the capacitor 116 form a low pass filter connected to the speed pick-up 18 including the coil 72 and amplifier 118 so as to reduce the signal voltage induced as the speed of the vehicle or signal frequency increases as depicted by curve 120 in FIGURE 5. The signal voltage induced in coil 72 is passed by the low pass filter, rectified by diode 122 and filtered by capacitor 124 so as to apply a bias voltage on the base of transistor 98 to hold it conductive below a predetermined vehicle speed or signal frequency 126 as denoted in FIGURE 5. At the same time, the base of transistor 100 is held at a positive cut-off potential relative to the emitter since the base is connected by a high pass filter to the speed pick-up 18. The high pass filter includes the capacitor 126 and the variable resistor 114 passing a voltage that increases as the signal frequency increases, as indicated by the curve 128 in FIGURE 5. The high pass filter is connected by the rectifier 130 to the base of transistor 100 to apply a bias voltage thereto which is filtered by capacitor 132.

Upon attainment of the prescribed speed limit 126, the transistor 98 approaches cut-off while the transistor 100 becomes favorably biased and conductive, cutting off the transistor 98. An energizing circuit is thereby completed through relay coil 88 so as to cause downshifting of the transmission by closing of relay switch 92. If the vehicle deviates from the prescribed path, a signal of insufficient intensity is picked up by coil 74 so that relay switch 82 remains open and no energization of motor 110 occurs. The variable resistors 112 and 114 therefore remain at a different setting to produce different bias voltage variations as indicated by dotted line curves 120′ and 128′ in FIGURE 5. Downshifting of the transmission occurs therefore at a lower speed 134 under path deviation conditions. Thus, the speed limits 134 and 126 form a cruising range, similar to the results achieved in the first embodiment, which may be varied by traffic authorities.

From the foregoing, it will be apparent that the control systems described measure the speed of the vehicle while travelling in a prescribed path in order to regulate the drive ratio of the transmission pursuant to a speed limit set by traffic authorities. Other conditions such as path deviation are also measured to correspondingly change the speed limit at which the regulatory influence is exercised. These regulatory influences are also transmitted by simple electrical components capable of withstanding the rigors of vehicle installation.

I claim:

1. In a vehicle transmission control system, the combination of ratio control means for regulating the drive ratio of the transmission, means developing an electrical effect corresponding in magnitude to the speed of the vehicle, means responsive to the magnitude of the electrical effect including means preventing actuation of the ratio control means by an electrical effect below a certain limit, the said magnitude responsive means being operative to cause the ratio control means to be actuated whenever the magnitude of the electrical effect is at the certain limit, and means external to the vehicle for varying the magnitude of the electrical effect corresponding to the speed of the vehicle.

2. In a transmission control system for an engine driven vehicle, the combination of ratio control means for regulating the drive ratio of the transmission and means for generating electrical energy, pick-up means developing an electrical signal from said electrical energy corresponding in intensity to the speed of the vehicle, an electrical network responsive to the intensity of the signal, the network including signal responsive means developing output signals in accordance with the speed of the vehicle, means developing from said output signals a control signal for causing the ratio control means to alter the drive ratio whenever the signal is at a predetermined level, and means varying the predetermined level in accordance with deviation of the vehicle from a predetermined path.

3. The combination of claim 2 wherein said signal responsive means includes, a semiconductor device having an input coupled to the pick-up means and an output operatively connected to the ratio control means, means biasing the semiconductor device beyond cut-off when the intensity of the signal is below said predetermined level, the semiconductor device being conductive when the signal is at the predetermined level.

References Cited by the Examiner

UNITED STATES PATENTS

| | | | |
|---|---|---|---|
| 2,317,400 | 4/1943 | Paulus et al. | 180—82.1 |
| 2,493,755 | 1/1950 | Fervill | 180—82.1 |
| 2,847,080 | 8/1958 | Zworykin et al. | 180—82 |
| 2,909,075 | 10/1959 | Brown et al. | 74—365 |
| 2,910,884 | 11/1959 | Peras | 74—472.3 |
| 2,952,346 | 9/1960 | Costa et al. | 74—365 |
| 2,965,188 | 12/1960 | Hanysz | 180—82 |
| 2,995,949 | 8/1961 | Gelenius | 74—365 |
| 3,019,666 | 2/1962 | Brennan et al. | 74—365 |
| 3,029,893 | 4/1962 | Mountjoy | 180—82.1 |
| 3,043,952 | 7/1962 | Reid | 180—82.1 |
| 3,088,337 | 5/1963 | Bemmann et al. | 74—752 |
| 3,122,940 | 3/1964 | Shimwell et al. | 74—365 |

DON A. WAITE, *Primary Examiner.*